Figure 1:
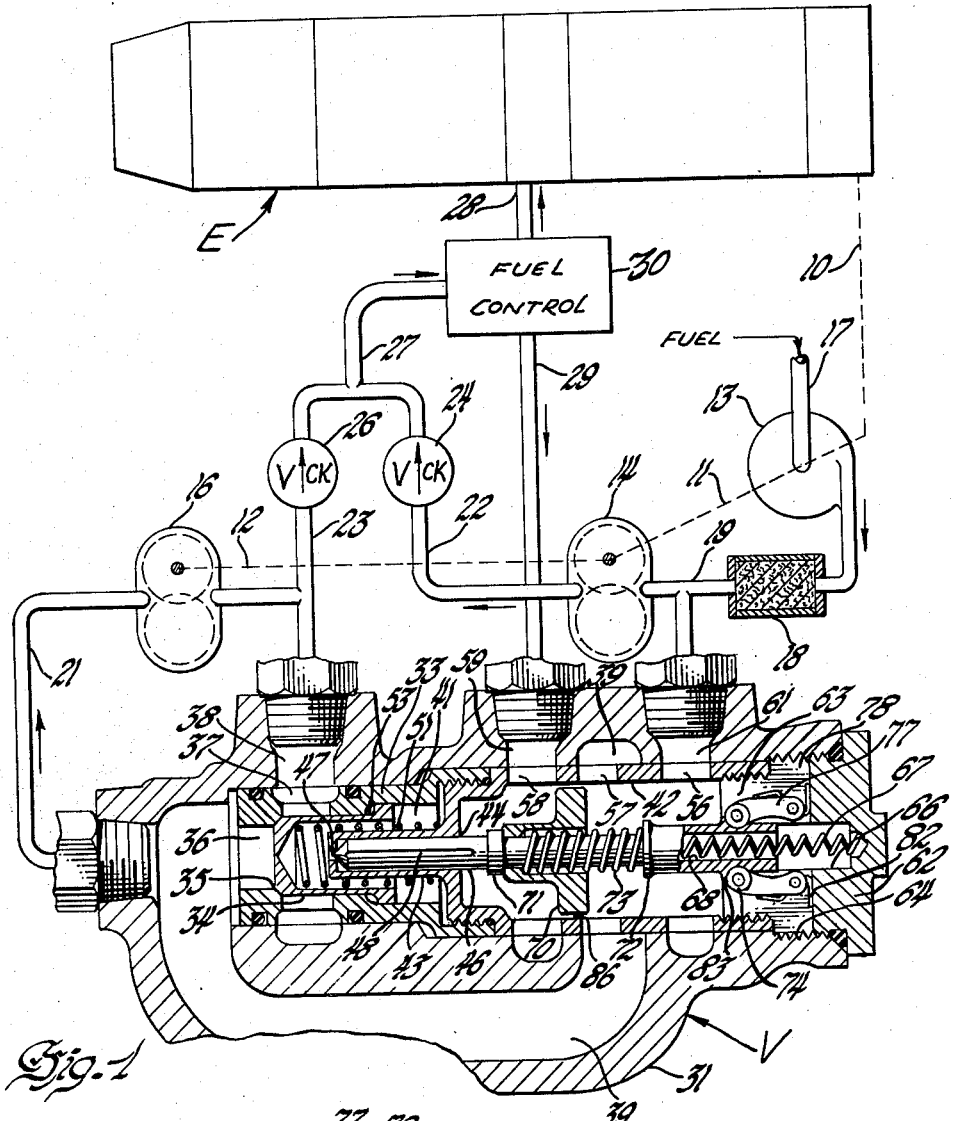

INVENTOR.
Arthur W. Gaubatz
BY
Paul Fitzpatrick
ATTORNEY

United States Patent Office 2,955,609
Patented Oct. 11, 1960

2,955,609

DUAL PUMP FUEL SYSTEM

Arthur W. Gaubatz, Indianapolis, Ind., assignor to General Motors Corporation, Detroit, Mich., a corporation of Delaware Filed Nov. 30, 1955, Ser. No. 550,034

5 Claims. (Cl. 137—108)

My invention relates to pumping systems adapted for wide variation in the quantity of fluid pumped and to controls therefor, and is particularly adapted to the requirements of aircraft gas turbine engine fuel systems.

It is well known that the fuel requirements of aircraft gas turbine engines vary over a wide range, varying principally according to the power level demanded of the engine, the altitude of the aircraft and temperature. From considerations of safety, it is highly desirable to provide in effect a standby fuel pump in addition to the pump which ordinarily supplies the fuel to the engine.

In accordance with the present invention, fuel is supplied to the engine by two pumps connected in parallel. The pumps are preferably of the same displacement and each is sufficient to operate the engine at high altitudes at full power or to operate the engine at reduced power at low altitudes. For maximum power at low altitudes, the full displacement of one pump plus part of the displacement of the other is required. Thus, if one pump fails, there will still be sufficient fuel to meet most engine requirements so that operation at reduced power is feasible.

Since the ratio of high altitude fuel demand to that at low altitudes is so small, the system as described is capable of providing many times the engine fuel requirements in normal flight at high altitudes. As in other gas turbine fuel systems, the excess fuel under all conditions of operation is returned to the inlets of the pumps by a fuel control or flow control which delivers the required quantity to the engine and bypasses or returns the excess.

An important feature of the present invention is a control responsive to the fuel returned which disables or bypasses one of the pumps when the quantity returned is greater than the discharge of that pump, or, in other words, the quantity required by the engine is less than the displacement of the other pump. In so doing, loss of power and heating of fuel from useless pumping against the metering pressure drops in the fuel control is eliminated and, by virtue of the small active service time of one pump, its life expectancy is improved.

The principal objects of the invention are to provide improved fluid pumping systems, to improve the operation of gas turbine aircraft engines, and to provide a system incorporating two pumps of which one may operate either as a standby or in augmentation of the displacement of the other pump under control of an automatic valve responsive to fuel demand.

Figure 2:
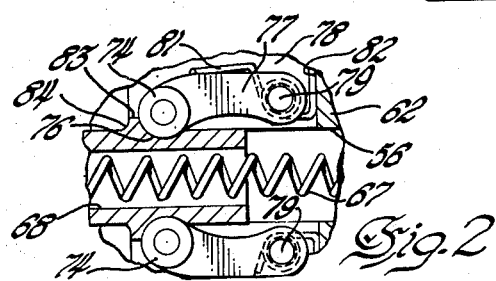

The nature of the invention and the advantages thereof will be more clearly apparent to those skilled in the art from the succeeding specification and the accompanying drawings in which:

Figure 1 is a schematic diagram of a fuel control system according to the invention including a longitudinal section of a control valve therefor, and Figure 2 is an enlarged view of a detail of the valve.

Referring to Figure 1, there is indicated at E a gas turbine engine which may be of a jet or propeller type and which is taken as illustrative of a typical user of fluid in accordance with the invention. Through mechanical connections indicated by the dotted lines 10, 11 and 12, the engine may drive a centrifugal boost pump 13, a first gear pump 14, and a gear pump 16. Fuel from the aircraft tanks or other storage enters the boost pump 13 through a conduit 17 and is discharged therefrom through a filter 18 into an inlet or source line 19 connected to the inlet of the first pump 14 and to the inlet of pump 16 through a control valve assembly indicated generally as V and a line 21. The discharge from pumps 14 and 16 flows through lines 22 and 23 and check valves 24 and 26 to a common output line or conduit 27 connected to an engine fuel control or flow control device 30 which may be any suitable device which controls the amount of fuel supplied to the engine through conduit 28.

Since the pumps 14 and 16 are ordinarily of the positive displacement type and usually are driven by the engine, the supply to the engine is metered by returning any excess displaced by the pumps to the inlet thereof. The structure in the fuel control or flow control 30 by which this is accomplished is immaterial to the invention and may be of any known type. The excess fuel is discharged by the fuel control through a return conduit 29 connected to valve V. The discharge line 23 of the second pump is also connected to valve V.

The valve assembly V comprises two principal elements: a bypass or dump valve or output control which is an unloading means for the second pump 16 and a control device responsive to the return flow which controls the operation of the dump valve.

Considering first the bypass valve per se, this is a known type of valve available commercially. Valve assembly V includes a housing or case 31 which may be a casting and which has a stepped cylindrical bore within which is mounted a sleeve or valve body 33. A movable valve thimble 34 normally engages a seat 35 which closes the bypass valve outlet 36 in the end of the sleeve. The inlet to the bypass valve is through lateral ports 37 in sleeve 33 communicating with port 38 in the housing connected to the outlet conduit 23 of the second pump. The outlet 36 of the dump valve communicates with a cored passage 39 in the case 31 which is connected to the second pump inlet conduit 21. The valve member 34 is ordinarily held against the seat 35 by pressure in a chamber 41 defined by the sleeve 33 and a second valve body or sleeve 42 which is threaded into the sleeve 33. A tubular guide 43 extends from the end wall 44 of sleeve 42 into the chamber 41. Guide 43 supports the stem 46 of a pilot valve which normally seats against and closes a small opening 47 in the end of guide 43. A groove 48 in the stem of pilot valve 46 vents the opening 47 when the stem moves away from the opening. With the pilot valve 46 closed, fluid under pressure in the ports 37 can leak through the slight clearance between the valve thimble 34 and the sleeve 33 into the chamber 41 to hold the thimble against the seat 35. The pressure in the outlet 36 is slight and, in the absence of any pressure, a compression spring 51 holds the valve member 34 seated. If the pilot valve 46 is opened by moving the stem 46 to the right, fluid in chamber 41 is relieved of pressure and valve 34 is lifted by fluid flowing through the annular clearance around the valve member into the annular space 53 between the enlarged end of the member 34 and the shoulder of the stepped bore in the valve sleeve. The bypass valve is thus opened and remains open until the pilot valve 46 closes the opening 47 whereupon fluid accumulates in the chamber 41 and closes the bypass valve, holding it against the seat.

As previously stated, the bypass valve just described is a known commercial type valve, and any valve amenable to remote or pilot control could be used for the same purpose.

We may now consider the actuating mechanism or control for the bypass valve. Mention has already been made of cylinder or sleeve 42 mounted within the cast valve case 31. This sleeve has lateral ports 56, 57 and 58 in the wall thereof which may be referred to as first end ports, center ports, and second end ports, respectively. The second end ports are open to inlet 59 to which the return conduit 29 connects. Center ports 57 open into the cored passage 39 which connects to the second pump inlet and to the outlet 36 of the bypass valve. First end ports 56 communicate with valve inlet 61 which connects to the inlet line or fluid source 19. One end of cylinder 42 is closed by the head 44 and the other end by a cap or plug 62 which includes a portion 63 threaded into the sleeve 42 and a portion 64 threaded into the valve casing 31. As will be seen, therefore, plug 62 closes the open end of the valve body and locates cylinder 42, which is threaded to and locates valve body 33. Head 62 is bored axially to provide a guide 66 for the right end of pilot valve stem 46. A coil spring 67 engaging the head 62 and received in a bore 68 in the stem 46 biases the pilot valve toward closed position. A shuttle valve or piston 70 is slidably mounted on stem 46 between abutments 71 and 72. Piston 70 is normally urged against abutment 71 by a light coil spring 73 received in a counterbore in the piston, but the piston may move to the right on the stem until it engages shoulder 72 by compressing spring 73.

In its normal position of repose with the pilot valve closed, piston 70 lies intermediate the second end port 58 and the center port 57. If it engages shoulder 72 it lies between center port 57 and first end port 56. Movement of stem 46 to the right to open the pilot valve is normally opposed by spring urged detent rollers 74 (see also Figure 2) which engage in a groove 76 in the stem 46. As indicated in Figure 2, these detent rollers are supported by arms 77 mounted in radial slots 78 in the head 62. The arms are pivotably mounted on pins 79 and are urged inwardly toward the axis of the plunger 46 by coil springs 81 bearing against the arms, looped around the pins, and bearing against the face 82 of the head 62. Upon movement of the stem 46 to the right to open the pilot valve, the detent rollers 74 ride over a ridge 83 on the stem and lodge against the shoulder or face 84 of the ridge 83. In this position, the detent arms 77 act to hold the pilot valve open until the force of the detent is overcome. Piston 70 is mounted in the cylinder with a slight clearance, as indicated at 86, so that some fuel can flow past the piston. The pressure difference between the two faces of the piston will be a function of the flow through this annular gap. It is preferable to provide the bypass around the piston by clearance between the piston and cylinder because this eliminates friction between the piston and cylinder which might interfere with accurate operation of the control.

For consideration of the operation of the system, let us assume that the engine operates at constant speed, that the pumps are driven at constant speed, and that the total capacity of each pump is 50 units thereby making the total pumping capacity 100 units. Assume further that the maximum demand of the engine (under maximum power conditions at low altitudes) is 67 units and the minimum demand of the unit (at low power setting at high altitudes) is 4 units. It will be seen, therefore, that either pump can supply approximately three quarters of the maximum demand of the engine or can supply the entire demand of the engine when it is no more than three quarters of its maximum value. Each pump can supply about 12 times the minimum requirement of the engine.

Spring 73 is provided to permit piston 70 to float on the control stem 46. Spring 67 is provided to exert a control force tending to seat the pilot valve. The detent arrangement is provided principally to avoid hunting of the control. In other words, the detent resists cutting out pump 16 and, when it is cut out, the detent requires a substantial change in conditions before pump 16 is again cut in.

If we assume the pumps operating normally and the engine requiring more than the output of one pump, fuel will be supplied to the first pump from line 19 and to the second pump from line 19 through ports 56 and 57, passage 39, and line 21. Thirty-three or more of the 100 units pumped will be returned through conduit 29 and enter the control cylinder 42 through second end ports 58. This return fuel flows into the second pump through ports 57. The flow moves piston 70 to the right against the light spring 73, which preferably may have, for example, a force range of from 2 lbs. to 3 lbs. over the travel of the piston 70 relative to shoulder 72. The piston thus takes an intermediate position allowing fuel to flow out of ports 57 from both end ports 56 and 58. A maximum of 17 units will flow to the second pump through ports 56.

When the engine fuel demand decreases to 50 units, 50 units will be returned through conduit 29, which will supply the entire input capacity of pump 16. Thus, there will no longer be any flow into the cylinder through ports 56 and there will be flow only from ports 58 to ports 57. This flow moves the control piston against the shoulder 72 but does not exert sufficient force thereon to overcome spring 67 and the detent, since the returned fuel is at pump inlet pressure, as is the fuel on the other side of the piston. Therefore, the bypass or dump valve remains closed. Piston 70 is in position to throttle flow from port 58 to port 56. The area of the annular bypass around piston 70 is such that at approximately 4 units of flow around the piston, the pressure drop across the piston will exert sufficient force on the piston to overcome detent 74 and spring 67 and open the pilot valve.

Therefore, we may assume that when the engine requirement drops to 46 units, the return flow will be 54 units, 50 of which can flow into pump 16 and 4 units of which flow past piston 70 and out through port 56 into line 19 and pump 14. The piston may be designed to develop, for example, a 10 lb. force with flow at this rate. In this example, the resistance of spring 67 may be approximately 6 lbs. and the force required to overcome the detent approximately 2 lbs. Pump outlet pressure may exert a force of about two pounds on the control stem area exposed to it through the small orifice 47. Under these conditions, there would thus be a net force of 4 lbs. to open the pilot valve, which would be sufficient to overcome any friction of the pilot valve. Therefore, at something between 3 and 4 units of flow out of port 56, the dump valve will be opened to bypass pump 16. Check valve 26 in the outlet of pump 16 will close. When pump 16 is bypassed there will be only 50 units supplied to the fuel control, but this is 3 or 4 more units than are required, and the remainder will continue to return through conduit 29. Since the input capacity of pump 16 will be supplied from its own output through the dump valve, the return fuel will continue to flow in at port 58, around piston 70, and out of ports 56 and 61. The spring 67 may exert approximately 6½ lbs. force when it is compressed sufficiently for the detent roller 74 to engage the shoulder 84 and the detent force at this point may be approximately 5 lbs. This being the case, the effective force of spring 67 less the force of the detent is approximately 1½ lbs. Since the pump 16 is dumped there is no significant pressure on the end of the control plunger. If the engine fuel requirements begin to increase or there is some slight loss of displacement from the main pump 14 so that the amount of returned fuel begins to dimish to the point at which the flow around the piston exerts a force of only 1½ lbs. on the piston, the valve spindle will move to the left and the pilot valve will close. As soon as the motion starts, the force of the detent decreases, and thus there is no tendency for the control valve to flutter or hunt; thus the orifice 47 will be closed and the dump valve will close to bring the secondary pump 16 into operation before the fuel requirement becomes as great as the output of pump 14. With pump 16 again in operation, fuel will flow in through port 56 and out through ports 57 to this pump and also in through port 58 from the return line and out through port 57 and piston 70 will float with the spring 73 partly compressed.

If, through some casualty, pump 14 ceased to displace any fluid, pressure would be lost in the outlet, check valve 24 would close, and pump 16 would supply the full requirements of the engine up to the limits of its capacity. If pump 16 were bypassed at the time of failure of pump 14, the failure of pump 14 would interrupt the return flow through the line 29 and spring 67 would close the pilot valve and thereby the bypass valve for pump 16 would thus be immediately put into operation.

It will be apparent that the arrangement for bypassing pump 16 will be in effect at most times during operation of the engine. However, pump 16 is available when it is needed and thus it is not necessary for pump 14 to be sufficiently large to satisfy the maximum requirement of the engine. Because the fuel displacement of the pumping system may be reduced by 50% at any time by cutting out pump 16, the amount of fuel passed through the fuel control and returned to the pumps is greatly diminished under most conditions of operation.

It will be apparent that the exact means through which the control device of the invention serves to operate a dump valve or in other manner disable or unload the pump 16 is entirely immaterial. Various arrangements may be resorted to for this purpose. The numerical values cited are purely by way of example for exposition, and may be any suitable value.

The detailed description herein of the preferred embodiment of the invention for the purpose of explaining the principles thereof is not to be construed as restricting or limiting the invention, since many modifications may be made by the exercise of skill in the art.

I claim:

1. A fluid pumping system, comprising, in combination, a first pump, a second pump, a flow control connected to the outlets of both pumps, a fluid source connected to the inlets of both pumps, a cylinder having first and second spaced ports, a conduit connecting the first port to the first pump inlet, a return conduit connecting the flow control to the second port, a conduit connecting the return conduit to the second pump inlet, a piston reciprocably mounted in the cylinder between the ports adapted to obstruct flow longitudinally of the cylinder, means connected to the piston biasing the piston away from the first port toward the second port, flow from the return conduit into the first pump developing a pressure drop across the piston, and means responsive to the said pressure drop connected to the second pump to disable the second pump.

2. A fluid pumping system, comprising, in combination, a first pump, a second pump, a flow control connected to the outlets of both pumps, a fluid source connected to the inlet of the first pump, a cylinder having first and second end ports and a center port intermediate the end ports, a conduit connecting the first end port to the first pump inlet, a return conduit connecting the flow control to the second end port, a conduit connecting the center port to the second pump inlet, a piston reciprocably mounted in the cylinder adapted to obstruct flow longitudinally of the cylinder, means connected to the piston biasing the piston away from the first end port toward the second end port to a normal position between the second end port and the center port, flow from the return conduit into the second pump moving the piston against the biasing means to a control position between the center and first ports, flow from the return conduit into the first pump developing a pressure drop across the piston in the control position, and means responsive to the said pressure drop connected to the second pump to disable the second pump.

3. A fluid pumping system, comprising, in combination, a first pump, a second pump, a flow control connected to the outlets of both pumps, a fluid source connected to the inlet of the first pump, a cylinder having first and second end ports and a center port intermediate the end ports, a conduit connecting the first end port to the first pump inlet, a return conduit connecting the flow control to the second end port, a conduit connecting the center port to the second pump inlet, a piston reciprocably mounted in the cylinder adapted to obstruct flow longitudinally of the cylinder, means connected to the piston biasing the piston away from the first end port toward the second end port to a normal position between the second end port and the center port, flow from the return conduit into the second pump moving the piston against the biasing means to a control position between the center and first ports, flow from the return conduit into the first pump developing a pressure on the piston, and means responsive to the said pressure on the piston to disable the second pump comprising a valve connected between the outlet and the inlet of the second pump, the valve including a stem connected to the piston for limited relative reciprocation, means connected to the stem biasing the stem in opposition to the said pressure, movement of the stem by the piston against the biasing means opening the valve.

4. A fluid pumping system, comprising, in combination, a first pump, a second pump, a flow control connected to the outlets of both pumps, a fluid source connected to the inlet of the first pump, a cylinder having first and second end ports and a center port intermediate the end ports, a conduit connecting the first end port to the first pump inlet, a return conduit connecting the flow control to the second end port, a conduit connecting the center port to the second pump inlet, a piston reciprocably mounted in the cylinder adapted to obstruct flow longitudinally of the cylinder, means connected to the piston biasing the piston away from the first end port toward the second end port to a normal position between the second end port and the center port, flow from the return conduit into the second pump moving the piston against the biasing means to a control position between the center and first ports, flow from the return conduit into the first pump when the piston is in the control position developing a pressure drop across the piston, differential pressure responsive means actuated by the pressure differential across the piston, and means connected to the differential pressure responsive means and to the second pump operative to disable the second pump in response to a predetermined pressure differential.

5. A system supplying fluid to a device having a variable fluid requirement comprising, in combination, a first pump having a capacity less than the maximum but greater than the minimum fluid requirement of the device, a second pump, valve means operable to disable said second pump, said means including a valve body, means connecting a fluid source to inlet ports of both pumps, said last named means including a passage through said body from said source to said second pump, the outlets of both pumps being connected to the device, a return conduit connecting the device to the source to return fluid pumped in excess of the requirement of the device, said return conduit passing through said body and comprising a portion of said passageway, and means responsive to flow in said portion of said return conduit connected to the disabling means effective to disable the second pump when the said flow exceeds the output of the second pump.

References Cited in the file of this patent

UNITED STATES PATENTS

| 2,440,371 | Holly | Apr. 27, 1948 |
| 2,506,611 | Neal et al. | May 9, 1950 |
| 2,545,856 | Orr | Mar. 20, 1951 |
| 2,607,297 | Walker et al. | Aug. 19, 1952 |
| 2,637,374 | Campbell | May 5, 1953 |
| 2,761,387 | Gaubatz | Sept. 4, 1956 |
| 2,835,323 | Booth | May 20, 1958 |

UNITED STATES PATENT OFFICE

CERTIFICATE OF CORRECTION

Patent No. 2,955,609              October 11, 1960

Arthur W. Gaubatz

It is hereby certified that error appears in the printed specification of the above numbered patent requiring correction and that the said Letters Patent should read as corrected below.

Column 2, line 17, for "inlet" read -- inlets --; column 4, line 12, after "piston", second occurrence, insert -- 70 --; column 5, line 12, after "pump 16" insert -- which --.

Signed and sealed this 25th day of April 1961.

(SEAL)
Attest:

ERNEST W. SWIDER                              DAVID L. LADD
Attesting Officer                                Commissioner of Patents